Dec. 13, 1955
C. E. EVANS ET AL
2,726,843
HIGH TEMPERATURE VALVE SEAT
Filed June 14, 1954
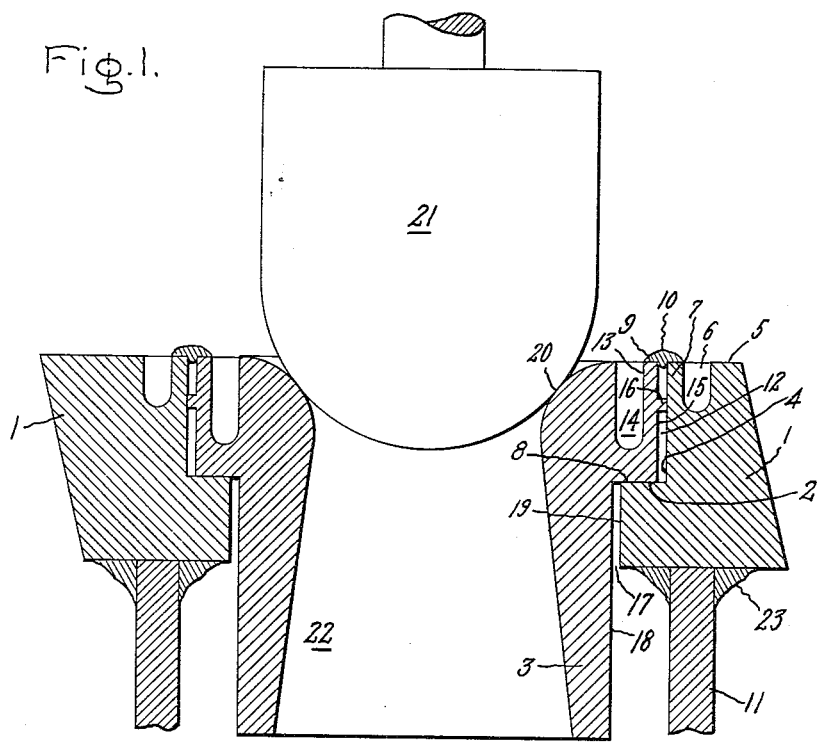
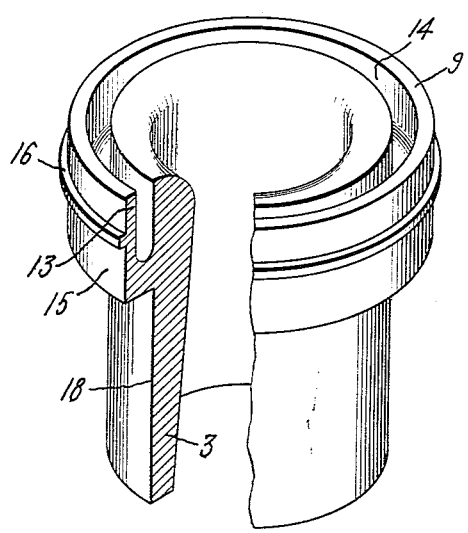
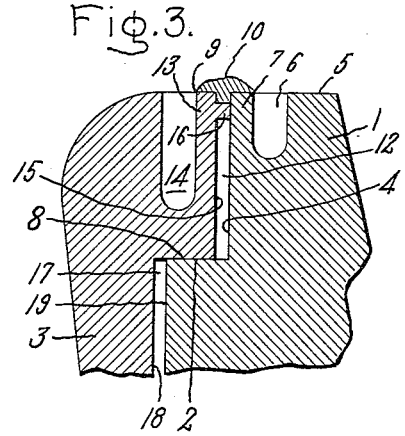
Inventors:
Charles E. Evans
Erwin C. Rhode
by *Kiess*
Their Attorney

United States Patent Office 2,726,843
Patented Dec. 13, 1955

2,726,843
HIGH TEMPERATURE VALVE SEAT

Charles E. Evans and Erwin C. Rohde, Marblehead, Mass., assignors to General Electric Company, a corporation of New York Application June 14, 1954, Serial No. 436,490

5 Claims. (Cl. 251—333)

This invention relates to valves for controlling the flow of elastic fluid, particularly to such a valve used in a high temperature turbine, having a valve seat supporting member which is subjected to large temperature variations.

In the typical high temperature turbine, the flow of steam through the turbine is controlled by a plurality of control valves which are located in a line, necessitating an unsymmetrical structure. Control valves of this general type and arrangement are disclosed for instance in the United States patent to F. H. Van Nest et al., 2,613,542, issued October 14, 1952. This lack of symmetry, in conjunction with uneven heating caused by operation of the turbine with only some of the valves open, causes distortion of the structure holding the valve seats. If this distortion is transmitted to the valve seat, the seating surface will no longer be circular and the valve will leak upon closure.

Accordingly, it is an object of this invention to insure that the seating surface of the valve seat will remain circular, even though the supporting structure has distorted.

A further object of this invention is to provide a valve seat which can be quickly and easily located and connected to its supporting structure.

Other objects and advantages will become apparent from the following description taken in connection with the accompanying drawings, in which Fig. 1 is a front view showing the valve and the valve seat arrangement mounted in place in a turbine; Fig. 2 is a perspective view of the valve seat member; and Fig. 3 illustrates a modified form of the invention.

Generally stated, the invention is practiced by providing an annular valve seat member connected to its supporting structure through comparatively thin annular portions which flex instead of transmitting distorting forces from the supporting structure to the valve seat member.

Referring to Fig. 1, there is illustrated a plate 1 forming one wall of the turbine valve chest inlet chamber and which defines a circular shoulder 2 adapted to support a valve seat member 3. The plate 1 is disposed in the turbine by being welded as at 23 to the side wall 11 of the turbine valve chest. Defined within the valve seat member 3 is a venturi passage 22. Surrounding the passage 22 at the top thereof is valve seating surface 20 which is a true surface of revolution. Valve head 21 seats on surface 20 when the valve is in the closed position. The valve seat member 3 defines a radially extending annular surface 8 which engages the mating surface 2 of the supporting plate 1 when inserted in the turbine. The diameters of the surfaces 4 and 19 above and below shoulder 2 respectively of plate 1 are slightly larger than the diameters of surfaces 15 and 18 above and below radially extending annular surface 8 respectively of valve seat member 3. Generous annular clearance spaces 12 and 17 are thus formed between plate 1 and valve seat member 3 when the valve seat member is secured in plate 1.

The distance between annular surface 8 and upper surface 9 of valve seat member 3 is substantially equal to the distance between shoulder 2 and upper surface 5 of plate 1. This enables valve seat 3 to be connected to member 1 by an annular seal weld indicated at 10.

To locate the valve seat 3 relative to the plate 1 so that the annular clearance spaces 12, 17 are maintained uniform during welding, a narrow annular land 16 is defined by the valve seat to contact the plate 1 when the valve seat is disposed therein. The diameter of land 16 is substantially equal to the diameter of surface 4 of plate 1. The land 16 is located substantially midway between surfaces 8 and 9 of valve seat 3.

With the arrangements known to the prior art, thermal distortion of the plate 1 tends to pull the valve seat member 3 out of its true circular shape, with the result that the seat 20 is no longer a true surface of revolution and valve head 21 will not fit properly.

To prevent the distortion of member 1 from deforming the seating surface 20 of valve seat 3, a cylindrical skirt portion 13 of comparatively thin wall thickness is formed on the valve seat member 3. The skirt 13 is defined by a deep narrow annular recess 14 in the upper surface 9 of valve seat 3. The outside diameter of recess 14 is slightly less than the diameter of surface 15 and extends axially from surface 9 substantially two-thirds the distance to surface 8 of valve seat 3.

By locating the land 16 opposite the recess 14 transmission of excessive forces from the plate 1 to valve seat 3 will be prevented by flexing of the cylindrical skirt 13 and the valve seat surface 20 will not be distorted. In other words, the tendency of the support plate 1 to distort the valve seat 3 through the weld 10 will be avoided by reason of flexing of the comparatively thin skirt 13.

To further reduce the tendency of valve seat 3 to distort in accordance with distortion of plate 1, a cylindrical skirt portion 7 of comparatively thin wall thickness may be formed in plate 1, as for instance by a deep annular groove 6 in the upper surface 5 of plate 1 which has an inside diameter slightly greater than the diameter of surface 4. The recess 6 extends into plate 1 substantially half the distance from upper surface 5 of plate 1 to surface 2.

The member 7 constitutes a further flexible skirt member preventing the transmission of excessive forces from plate 1 to skirt 13. The skirt 7 is made sufficiently wide to enable the supporting plate 1 to be welded to the valve seat by welding the skirts 7, 13 to each other, as shown at 10.

The valve seat member 3 is installed in the following manner:

The member 3 is disposed in the opening in plate 1 with the locating land 16 contacting surface 4 so as to seat the member 3 exactly concentric with the surfaces 4, 19, and the shoulder 8 engaging the annular seat 2.

It will be seen at this point of the installation that there are annular clearance spaces 15, 17 formed between the upper and lower parts of the valve seat and plate 1 respectively, with the valve seat being located concentrically in plate 1 by the locating land 16 contacting the surface 4. The valve seat 3 and plate 1 are then welded at 10 to maintain their relative positions.

Thus it will be seen that the valve seat will not be deformed out of its true surface of revolution regardless of distortion of the valve seat supporting member, and the valve seat can be quickly and easily installed and located relative to the valve seat supporting member.

While only one embodiment of the invention has been described specifically, it will be apparent to those skilled in the art that many alterations and substitutions of mechanical equivalents may be made. For instance, as illustrated in Fig. 3, the land 16 may be moved up close to the upper surface 9 of valve seat 3, so that it will also serve as a "backing strip" for the weld 10. Also, in place of annular land 16, the valve seat 3 could be provided with radially projecting bosses. Or, separate spacer members placed in the clearance 15 at circumferentially spaced locations prior to welding, could be used. Such spacers could be of a readily crushable material such as a suitable ceramic, which would transmit even less force from plate 1 to valve seat member 3 than would a metal spacer. A ceramic member would also form a good "back-up ring" for the weld 10. It would also be well within the scope of the applicant's invention to locate the spacer land 16, or the equivalent, in the clearance space 17.

Other modifications within the scope of the invention might include locating the spacer means on the support member 1 rather than on the valve seat member 3. It may not be absolutely necessary in all cases that the upper surfaces of the skirt portions 7, 9 be flush wiht one another.

Other equivalents will occur to those skilled in the art, and it is of course intended to cover by the appended claims all such modifications as fall within the true spirit and scope of the invention.

What we claim as new and desire to secure by Letters Patent of the United States is:

1. In a valve having a reciprocable head member adapted to sealingly engage a seat member, the combination of a cylindrical valve seat member defining an axial passage therethrough and having at one end of said passage a seating area forming a true surface of revolution adapted to be contacted by the valve head member, the valve seat member having portions of two different external diameters which are connected by a first radially extending annular surface, the portion of larger diameter being provided with a deep annular groove extending axially in from the end of the valve seat member, the outside diameter of said groove being slightly less than the outside diameter of said portion of larger diameter whereby a cylindrical skirt portion of small radial thickness relative to its axial length is formed, a supporting member for the valve seat defining a circular opening of two different diameter portions adapted to receive the valve seat, the smaller diameter portion forming a small annular clearance space with the smaller diameter portion of the seat member and the larger diameter portion likewise forming a small annular clearance space with the outer surface of the larger diameter portion of the seat member, said supporting member defining a second radially extending annular surface connecting the two portions of different diameters and adapted to abut said first radially extending annular surface, spacer means disposed on said skirt portion to locate the valve seat relative to the supporting member, and means connecting the supporting member to the skirt portion of the valve seat member.

2. A valve in accordance with claim 1 in which the spacer means locating the valve seat member relative to the supporting member comprises a narrow annular land on the skirt portion of the valve seat member.

3. A seat assembly for a valve having a reciprocable head member adapted to sealingly engage the seat assembly comprising, a generally cylindrical valve seat insert member, said insert member defining an axial passage therethrough and having at one end of said passage a seating area forming a true surface of revolution adapted to be contacted by the valve head member, the insert member having portions of two different external diameters which are connected by a first radially extending annular surface, the portion of larger diameter forming a first axially extending cylindrical skirt portion of small radial thickness relative to its axial length and spaced radially from said seating area, a valve insert support member defining a circular opening having two adjacent cylindrical portions of different diameters connected by a second radially extending annular surface, the smaller diameter portion of said opening being spaced radially from the smaller diameter portion of said seat insert member to define a first annular clearance space, the larger diameter portion of said opening being spaced radially from the surface of said skirt portion of the insert member to define a second annular clearance space, said first radially extending annular surface abutting said second radially extending annular surface, the support member defining an annular groove concentric with the larger diameter portion of said opening and forming a second thin axially extending skirt portion disposed parallel to said first skirt portion, spacer means disposed between said skirt portions to locate the valve seat insert member relative to the supporting member, means connecting said first and second skirt members, whereby the comparative flexibility of said connected annular skirt portions prevents excessive stresses being transmitted from the support member to the insert member and said annular clearance spaces permit free differential thermal expansion between said support member and said insert member.

4. A valve seat assembly in accordance with claim 3 in which the distances from said first and second radially extending surfaces to the axial outer surfaces of the skirt portions defined by the valve seat member and the supporting member respectively are substantially equal, and the means connecting the valve seat to the supporting member comprises a weld deposit securing the narrow annular skirt portions together.

5. In a valve having a reciprocable head member adapted to sealingly engage a seat member, the combination of a cylindrical valve seat member defining a passage therethrough and having at one end of said passage a seating area forming a true surface of revolution adapted to be contacted by the valve head member, the valve seat member having portions of two different external diameters which are connected by a first radially extending annular surface, the portion of larger diameter being provided with a deep annular groove extending axially in from the end of the valve seat member, the outside diameter of said groove being slightly less than the outside diameter of said portion of larger diameter whereby a cylindrical skirt portion of small radial thickness relative to its axial length is formed, a supporting member for the valve seat, the supporting member defining a circular opening of two different diameter portions adapted to receive the valve seat, the smaller diameter portion forming an annular clearance space with the smaller diameter portion of the seat member and the larger diameter portion likewise forming an annular clearance space with the outer surface of the larger diameter portion of the seat member, said supporting member defining a second radially extending annular surface connecting the two portions of different diameters and adapted to abut said first radially extending annular surface, the distances from said first and second radially extending surfaces to the axial outer surfaces of the skirt portion defined by the valve seat member and the supporting member respectively being substantially equal whereby the valve seat is substantially flush with the adjacent portion of the supporting member, a narrow annular locating land defined by the valve seat on said skirt portion and disposed adjacent the outer end thereof, the diameter of said land being substantially equal to the diameter of the supporting member above said second radially extending surface whereby the valve seat is located relative to the supporting member, and means connecting the valve seat to the supporting member comprising weld metal deposited against the land as a backing strip.

References Cited in the file of this patent

UNITED STATES PATENTS

| | | |
|---|---|---|
| 593,526 | Hughes | Nov. 9, 1897 |
| 921,741 | Rowe | May 18, 1909 |

FOREIGN PATENTS

| | | |
|---|---|---|
| 500,785 | Great Britain | Feb. 15, 1939 |